United States Patent
Shimoyama

(10) Patent No.: US 7,120,296 B2
(45) Date of Patent: Oct. 10, 2006

(54) INFORMATION PROCESSING METHOD

(75) Inventor: Tomohiko Shimoyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 723 days.

(21) Appl. No.: 10/364,474

(22) Filed: Feb. 12, 2003

(65) Prior Publication Data

US 2003/0161529 A1  Aug. 28, 2003

(30) Foreign Application Priority Data

Feb. 27, 2002  (JP)  ............... 2002-051355

(51) Int. Cl.
G06K 9/00  (2006.01)

(52) U.S. Cl. ............... 382/165; 382/167; 382/274; 382/190; 358/1.9; 358/518

(58) Field of Classification Search ............... 382/162, 382/164, 165, 167, 274, 190, 180, 170; 358/1.9, 358/518–523
See application file for complete search history.

(56) References Cited

U.S. PATENT DOCUMENTS

| | | | |
|---|---|---|---|
| 5,032,913 A * | 7/1991 | Hattori et al. ............... 348/70 |
| 5,414,537 A * | 5/1995 | Omuro et al. ............... 358/518 |
| 5,754,683 A * | 5/1998 | Hayashi et al. ............. 382/167 |
| 5,978,506 A * | 11/1999 | Murayama et al. ......... 382/162 |
| 6,005,585 A * | 12/1999 | Soutome et al. ............ 345/589 |
| 6,654,494 B1 * | 11/2003 | Sawada et al. ............. 382/167 |
| 7,006,690 B1 * | 2/2006 | Imura ......................... 382/167 |
| 2002/0036696 A1 * | 3/2002 | Takemoto .................... 348/223 |

* cited by examiner

Primary Examiner—Matthew C. Bella
Assistant Examiner—Ali Bayat
(74) Attorney, Agent, or Firm—Fitzparick, Cella, Harper & Scinto

(57) ABSTRACT

An information processing method, comprising acquiring a photographed image of a color sample including specific color markers, binarizing a signal indicating luminosity of the photographed image, detecting a marker area, plotting a color signal of the marker area on a color plane, labeling for a plotting result, and setting a color recognition parameter for identifying the color area of the specific color markers from the labeling result.

15 Claims, 17 Drawing Sheets

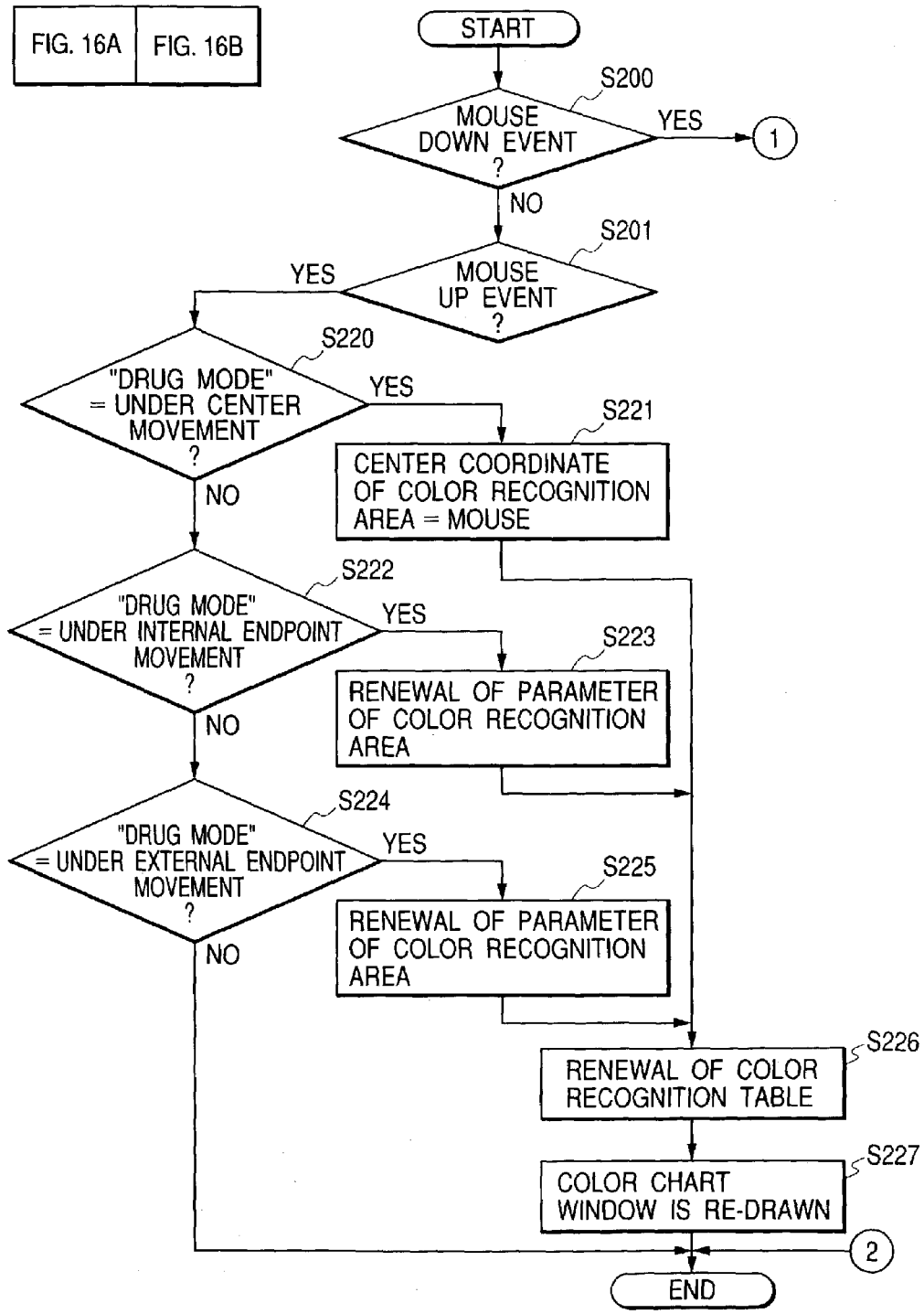

FIG. 19

| RED | BLUE | BLUE | RED | RED |
|---|---|---|---|---|
| WHITE | RED | BLUE | BLUE | RED |
| WHITE | WHITE | WHITE | WHITE | RED |
| BLACK | BLACK | BROWN | BROWN | BROWN |
| YELLOW | YELLOW | BROWN | BROWN | BROWN |

↑ FORMATION OF THREE COLORS

| 2 | 0 | 0 | 0 | 3 |
|---|---|---|---|---|
| 2 | 2 | 0 | 0 | 3 |
| 1 | 1 | 0 | 0 | 0 |
| 1 | 1 | 0 | 0 | 0 |
| 2 | 2 | 2 | 0 | 0 |

INFORMATION PROCESSING METHOD

BACKGROUND OF THE INVENTION

1. Field of the Invention

The present invention relates to setting color recognition parameters for recognizing specific colors from an image.

2. Description of the Related Art

There is a need for recognizing specific colors from an image for recognizing color markers from the image. A color is recognized on a computer by determining a specific color by determining whether a value indicating a color of each pixel on a screen exists within a predetermined range.

For example, to detect a red color, pixel color-difference signals Cb, Cr forming a pixel have been specified in the following range: $-1<Cb<+3$ and $+25<Cr<+127$ In this case, to specify the red color, a set of values ($-1$, $+3$, $+25$, $+127$) has been used.

Generally, if the lighting or other conditions change, the range for specifying a specific color need be readjusted for the conditions. For example, color recognition parameters having been used under a fluorescent lamp need be readjusted under an incandescent lamp.

Conventionally, an operator has adjusted the color recognition parameters by adjusting values manually while observing a recognition rate.

This kind of color recognition parameter adjustment, however, requires an operator to have a lot of skill and to repeat the same work for each color inefficiently.

In addition, this kind of color specification method using a set of numerical values is not intuitive, which leads to a difficulty in specifying a recognized color.

SUMMARY OF THE INVENTION

In view of these points, the present invention has been provided. Therefore it is an object of the present invention to reduce user's labor for setting color recognition parameters by enabling the color recognition parameters to be set by analyzing a photographed image of a color sample.

To achieve the above object, the present invention provides: an information processing method for setting a color recognition parameter for recognizing a specific color from an image, comprising the steps of acquiring a photographed image of a color sample in which markers are arranged in a predetermined pattern and finding (calculating) the color recognition parameters for detecting the markers by analyzing the photographed image, wherein a predetermined guide pattern is added to the color sample.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 19 is a pattern diagram showing hex-valuing of an image.

DETAILED DESCRIPTION OF THE PREFERRED EMBODIMENTS (First Embodiment)

This embodiment relates to a color parameter setting device for setting color parameters for detecting a specific color marker for an image processor finding the specific color marker in an image.

Figure 1:
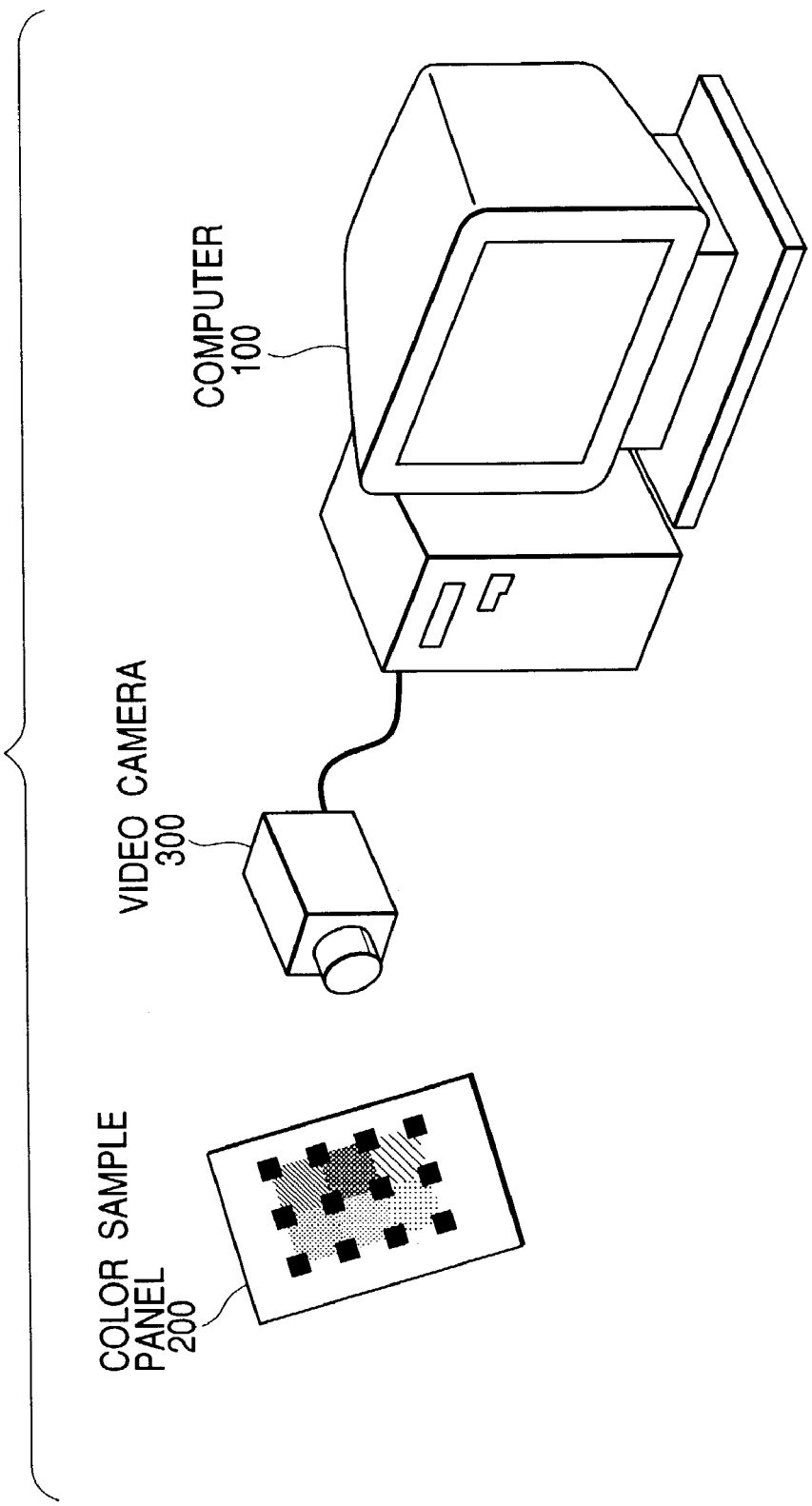
FIG. 1 is a general view of hardware according to a first embodiment.

Referring to FIG. 1, there is shown a general view of a system according to this embodiment. In the embodiment, the system mounts a software for a computer. A system of the embodiment comprises a computer 100, a color sample panel 200, and a video camera 300.

The color sample panel 200 is photographed using the video camera 300 and the image is imported to the computer 100. The computer 100 extracts color information of the color sample panel 200 from the imported image and finds color parameters for recognizing a marker included in the color sample panel.

Figure 2:
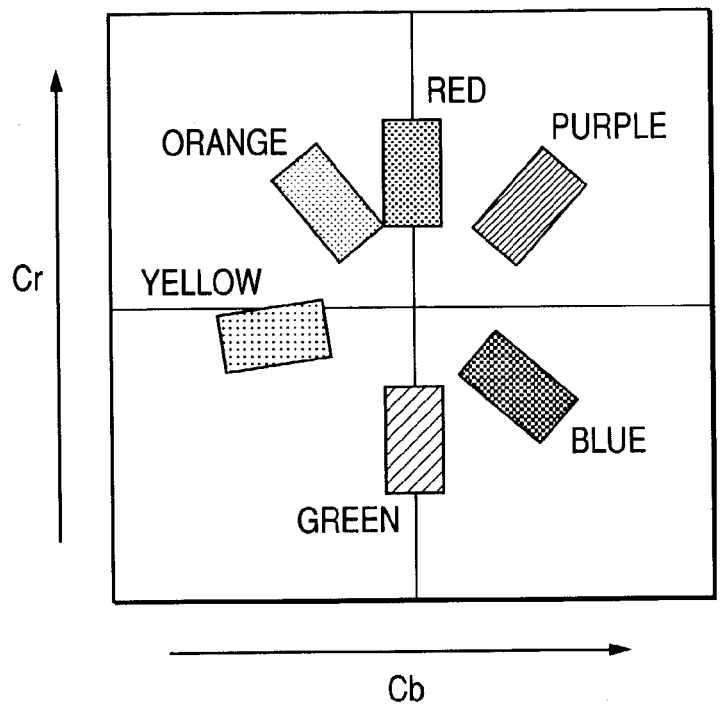
FIG. 2 is a view showing a color recognition area in a Cb, Cr space.

Each of the color parameters indicates an area on a Cb-Cr plane as shown in FIG. 2. The Cb-Cr plane is a color plane defined by a color-difference signal indicating a hue of a luminance/color-difference signal. The area is rectangular and radially extending from a starting point on the Cb-Cr plane. A shown in FIG. 3, the color parameters include parameters indicating a central point, a size in the circumferential direction, a size in the radial direction of the rectangle. The color recognition program uses the color parameters to recognize a color by determining whether the Cb and Cr values of a pixel color are within the rectangular area indicated by the color parameters.

Figure 4:
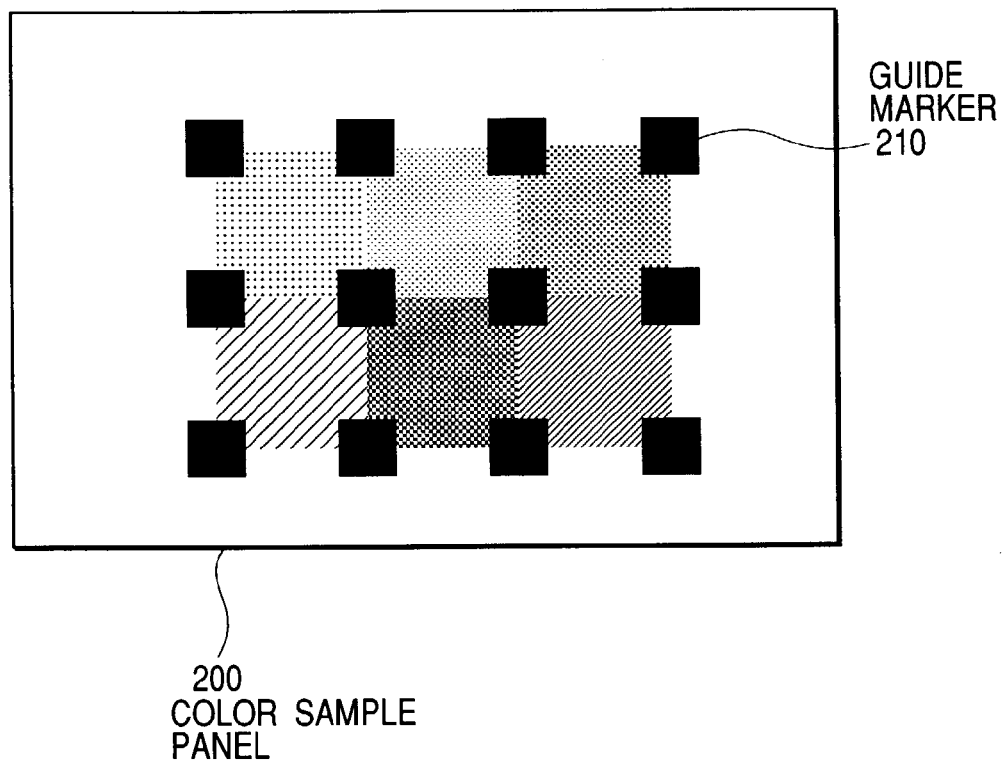
FIG. 4 is a view showing a color sample panel.

Referring to FIG. 4, there is shown the color sample panel 200. In this embodiment, six colors are prepared as markers and arranged in two rows and three columns in the color sample panel. On the color sample panel 200, guide markers 210 are arranged in a lattice shape so as to be arranged at four corners of each marker. The computer 100 recognizes the guide markers 210 to recognize a position of the color sample panel 200 in the captured image.

Figure 5:
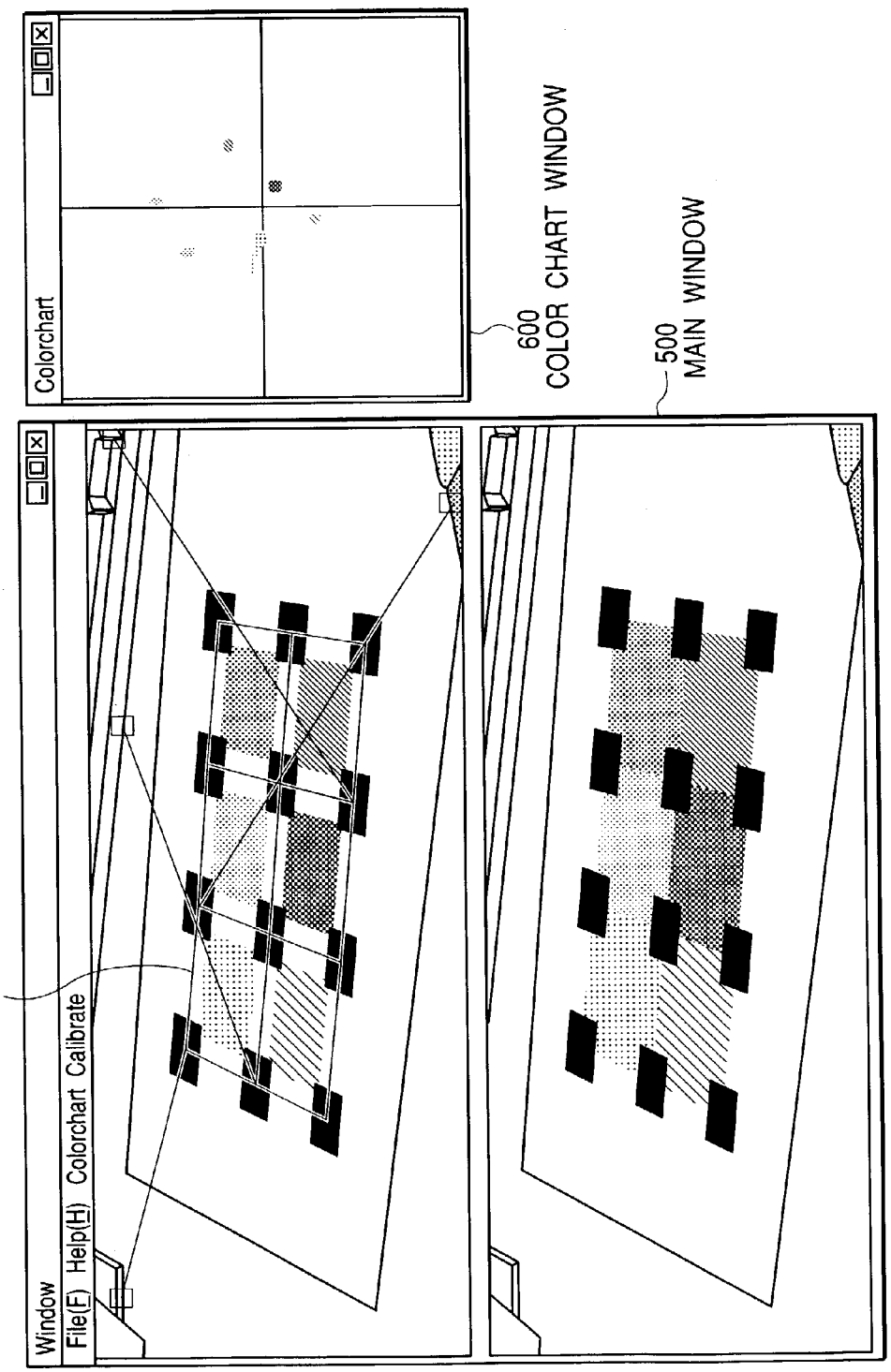
FIG. 5 is a view showing an execution screen of the embodiment.

Referring to FIG. 5, there is shown an operation screen of this embodiment. The operation screen comprises a main window 500 and a color chart window 600.

The main window 500 has a menu bar and it is provided to executed whole control in this embodiment. An actual image is displayed on the lower half of the main window 500, while an image recognition view is displayed on the upper half of the main window 500.

The image recognition view is generated and displayed by combining a monochrome image acquired by binarizing the actual image with an analysis result of the binary image. The binarization is executedly finding an average of luminosity of the full screen and using the average as a threshold. When a marker area 510 is recognized by analyzing the binary image, the position of the marker area recognized with red is displayed on the binary image. In this embodiment, six markers are used and therefore six marker areas are detected.

The color chart window 600 is a graph with Cb as a horizontal axis and Cr as a vertical axis. It is used for plotting points at the Cb and Cr values of the color sample resulting from recognizing the color sample panel.

The program according to this embodiment locates the color sample panel on the screen from the recognition result of the captured image and finds the Cb and Cr values of the color sample. Thereafter, it plots points at the Cb and Cr values of the acquired color sample on the color chart window.

The color of the plotted points depends upon a color sample. That is, different colors are plotted on different color samples respectively. The color recognition parameters are generated on the basis of the color chart displayed on the window.

Figure 6:
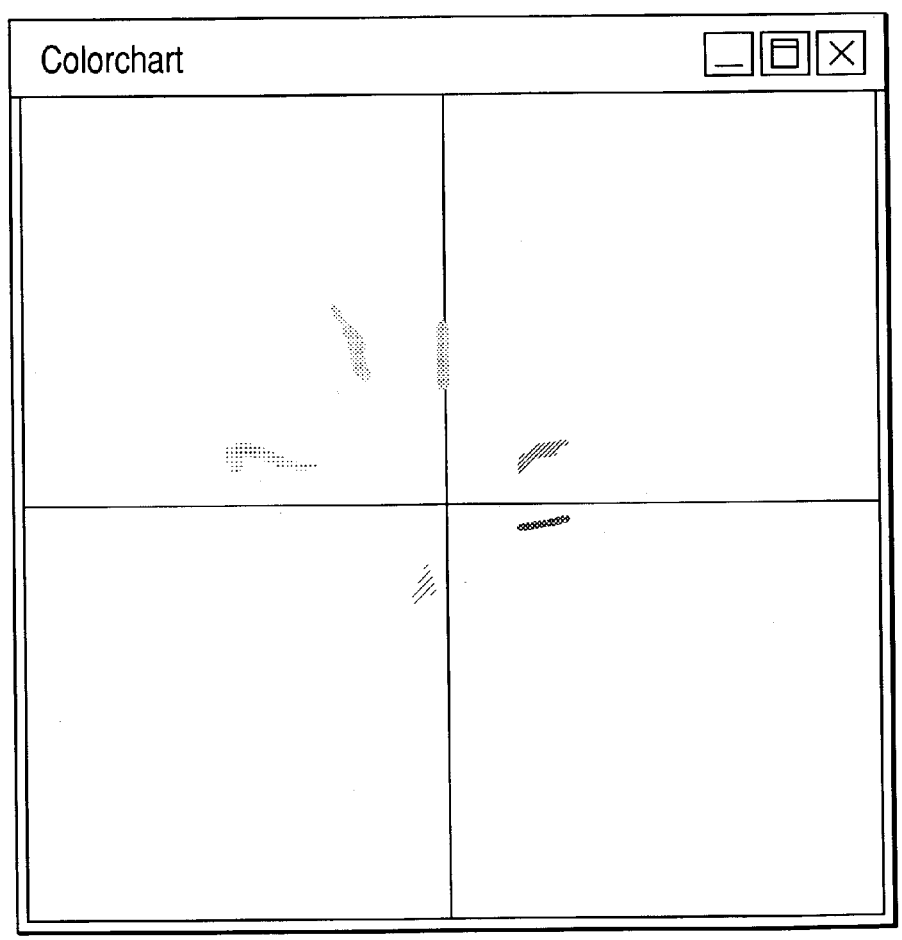
FIG. 6 is a view showing an example of a plotted color chart.

The program is always capturing an image from the video camera 300 and when recognizing the color sample panel it plots the result of the recognition on the color chart window 600. If an angle of the color sample panel changed 200 is or the like, a color chart is plotted in a form as shown in FIG. 6 in many cases.

The color recognition parameter is generated by choosing "calibrate" from the menu bar on the main window 500.

Figure 7:
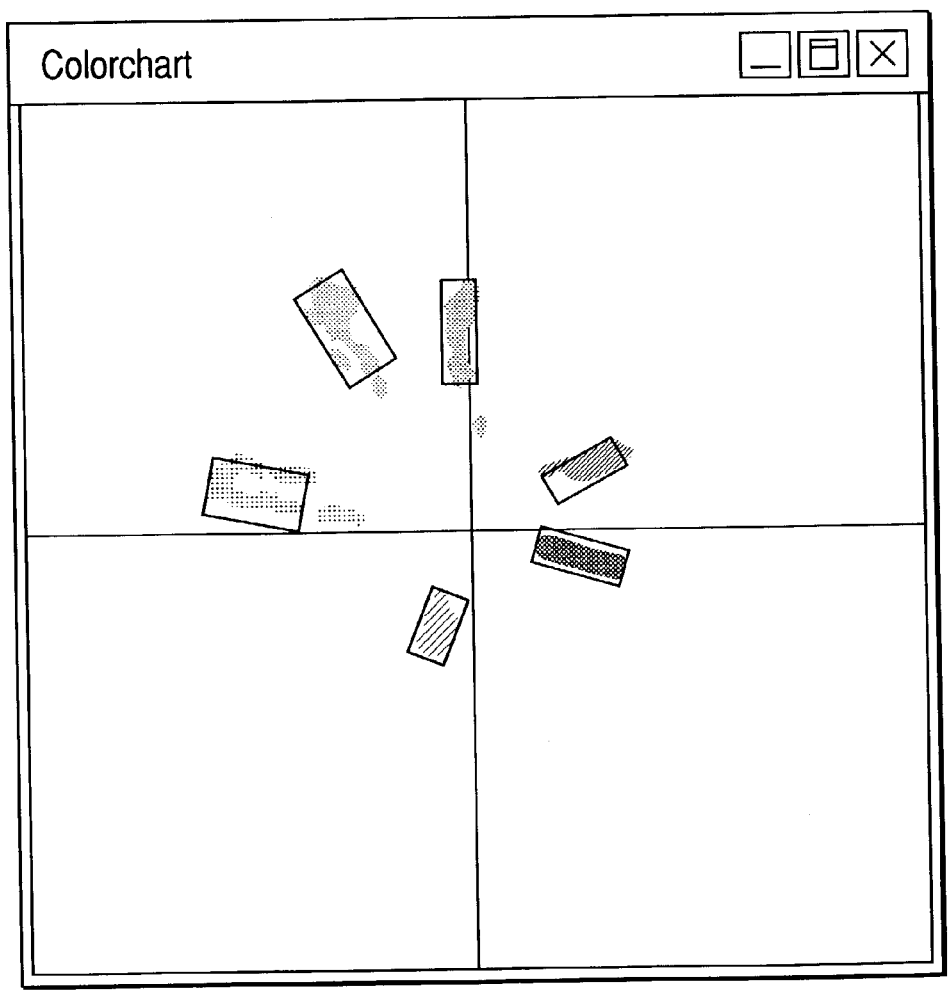
FIG. 7 is a view showing an example of setting a color recognition area from the color chart.

The color recognition parameters are generated on the basis of the color area plotted on the color chart window 600. The color recognition parameters correspond to the minimum rectangle containing the maximum island made of points on the color chart. It is shown in FIG. 7 as an example.

Figure 8:
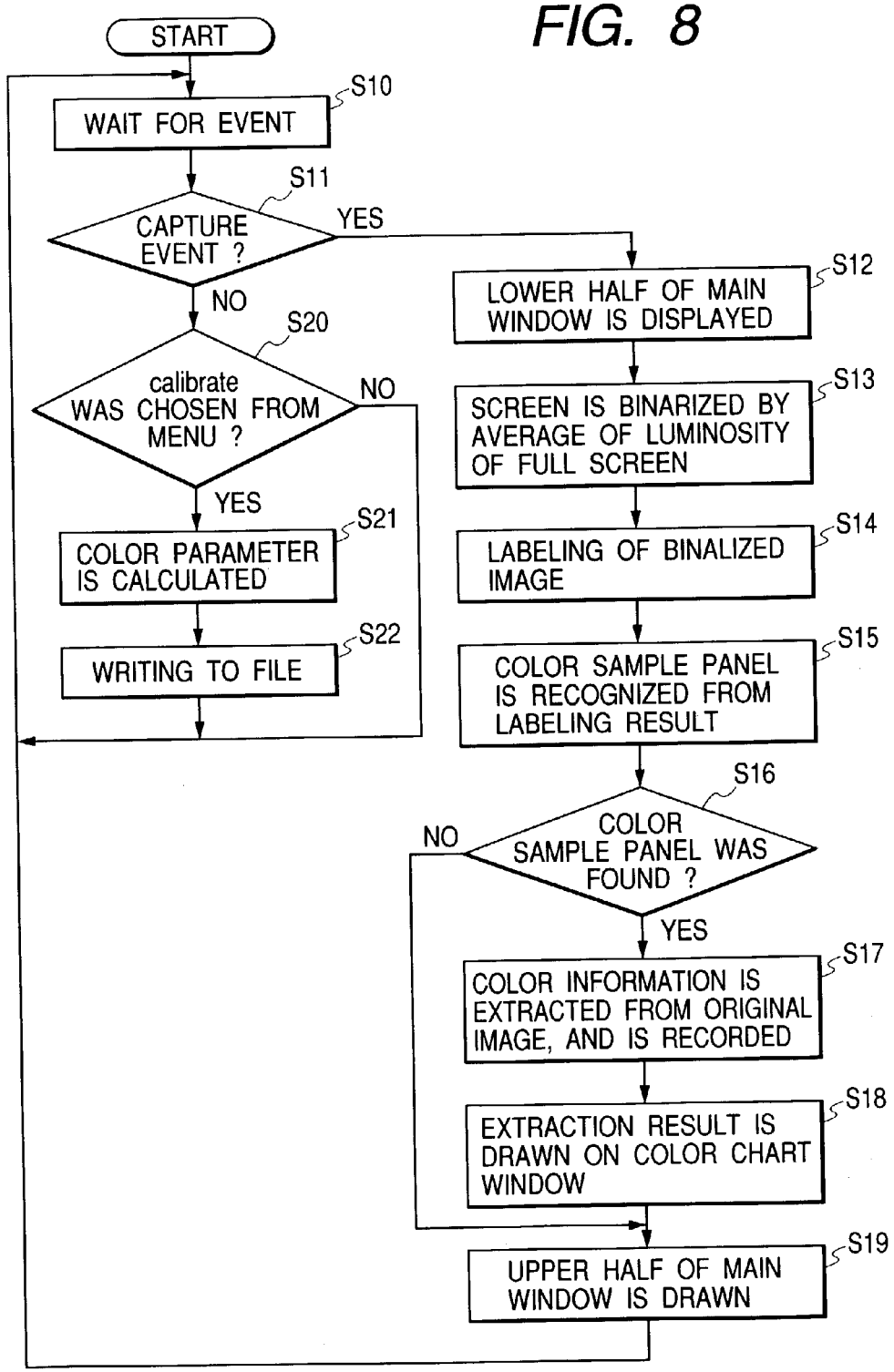
FIG. 8 is a flowchart according to the first embodiment.

Referring to FIG. 8, there is shown a flowchart of the main routine of the program according to this embodiment. The program operates in an event-driven method. When it is completed to capture a single screen from the video camera 300, a capture event occurs. When "calibrate" is chosen from the menu, a color parameter generation event occurs. The main routine is generally awaiting an event (S10) and performs a capture event process (S12 to S19) and a color parameter generation process (S21 to S22) according to an event that has occurred (S11, S20).

If a capture event occurs, the captured screen is imported and the imported screen is displayed on the lower half of the main window 500.

Thereafter, an average of luminosity of the full screen is calculated and respective pixels forming the screen are binarized using the average (S13). This process is performed by using luminance signals of the luminance/color-difference signals indicating the respective pixels.

The binarized image is labeled to generate a list of points expected to be guide markers 210 of the color sample panel 200 displayed on the imported screen (S14). The description of the labeling algorithm is omitted here since it is well known.

Points arranged in a lattice shape on four rows and three columns are detected as guide markers from the labeling result and the color sample panel 200 displayed on the screen is recognized (S15). To find out points arranged in the lattice shape from the list of the points generated based on the labeling, points arranged in a straight line are extracted with a Hough transform and a combination of straight lines is estimated to recognize the points from the evaluation result. The description of the Hough transform algorithm is omitted here since it is well known.

If the color sample panel 200 was found (S16), locations of the color samples (six colors) are calculated from the positions of the color sample panel 200 and an average of color information of the corresponding locations on the original screen is calculated (S17). Unless the color sample panel 200 was found, the control progresses to step S19.

The acquired color information is stored in an array of 256×256 at the same time. This array corresponds to the points of the color chart. In an initial state, the array is filled with only 0s (zeros). Then, color sample IDs 1 to 6 are substituted for the elements (Cb+128, Cr+128) according to the acquired color information.

The calculated color information is plotted on the color chart window 600 (S18).

Finally, the binarized image is displayed as a monochrome image on the upper half of the main window 500 (S19). In addition, points arranged in a straight line found in a process of searching for the color sample panel are displayed in green and the position of the color sample panel is displayed in red if the color sample panel 200 is found.

Figure 3:
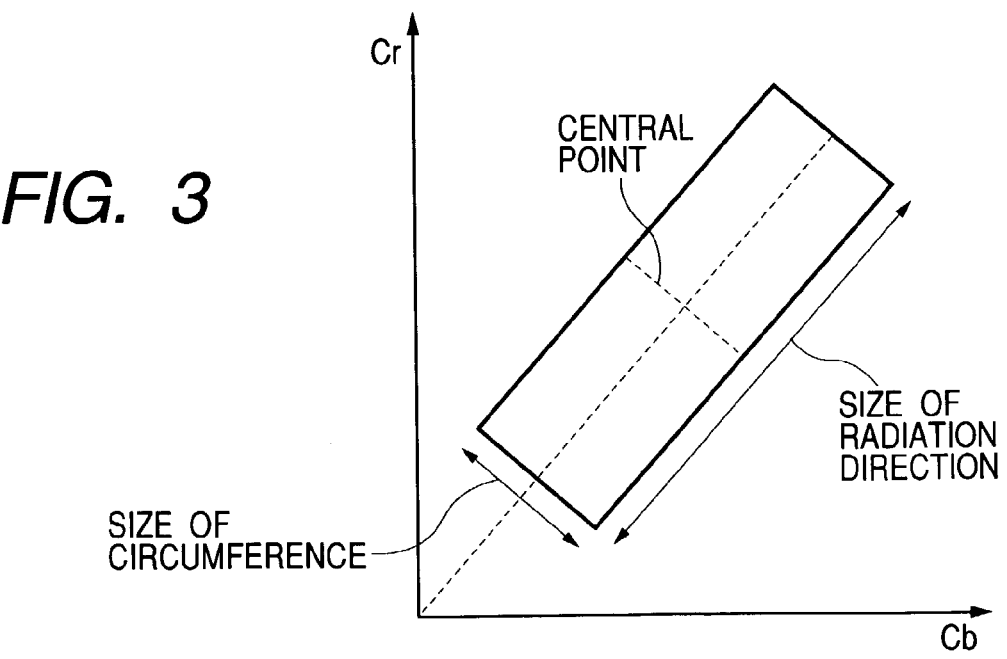
FIG. 3 is a view showing parameters necessary for specifying the color recognition area.

On the other hand, if a color parameter generation event occurred (S20), a color parameter is calculated on the basis of the array of 256×256 where the information of the color chart 200 is stored (S21). After labeling with the content of the array, an island having the largest area is found for each color. The values of the central points of the islands are assumed to be the Cb and Cr values of the color parameters and the sizes of the rectangles each circumscribing each island as shown in FIG. 3 are recorded as color parameters of the colors.

The acquired color parameters are written to a file (S22). More specifically, the operation is to write color IDs, the centers of the rectangles, the sizes of the rectangles in the radial direction, and the sizes of the rectangles in the circumferential direction to the file.

According to this embodiment, the color recognition parameters can be set by photographing a color sample, thereby reducing user's labor for setting the color recognition parameters. Furthermore, the color sample includes a plurality of markers together with guide markers arranged in a lattice shape in such a way that they enclose each marker and therefore a marker area can be detected precisely from the photographed image of the color sample. In this embodiment, the marker area can be detected simply and precisely by using only signals indicating luminosity. Still further, a plurality of markers have different hues as shown in FIG. 2, and therefore the marker area can be recognized precisely by using signals indicating only hues, thereby simplifying the color recognition parameters.

(Second Embodiment)

This embodiment is an image processor for finding specific color markers in an image.

Figure 9:
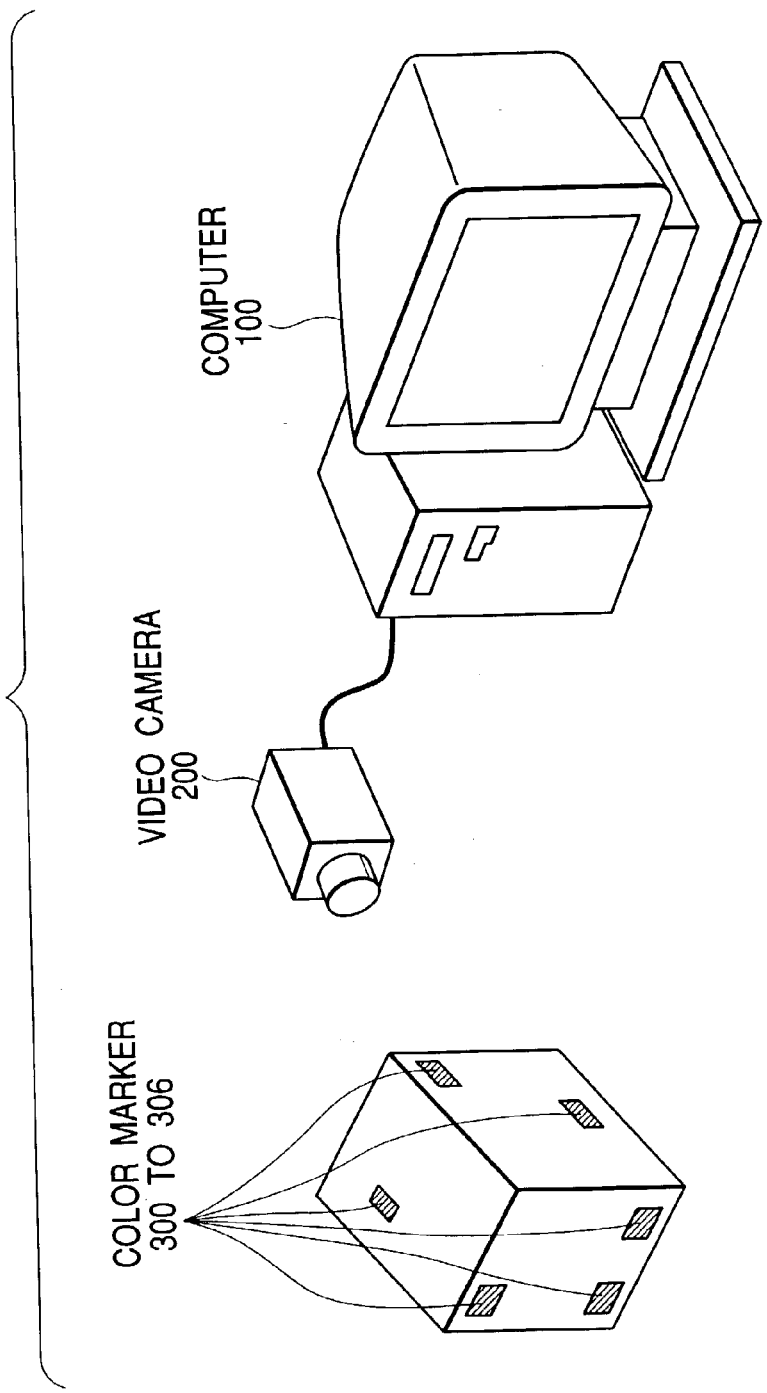
FIG. 9 is a general view of hardware according to a second embodiment.

Referring to FIG. 9, there is shown a general view of a system according to this embodiment. In the embodiment, the system mounts a software for a computer. In the embodiment, the system comprises a computer 100, a video camera 200, and color markers 300 to 306.

Figure 10:
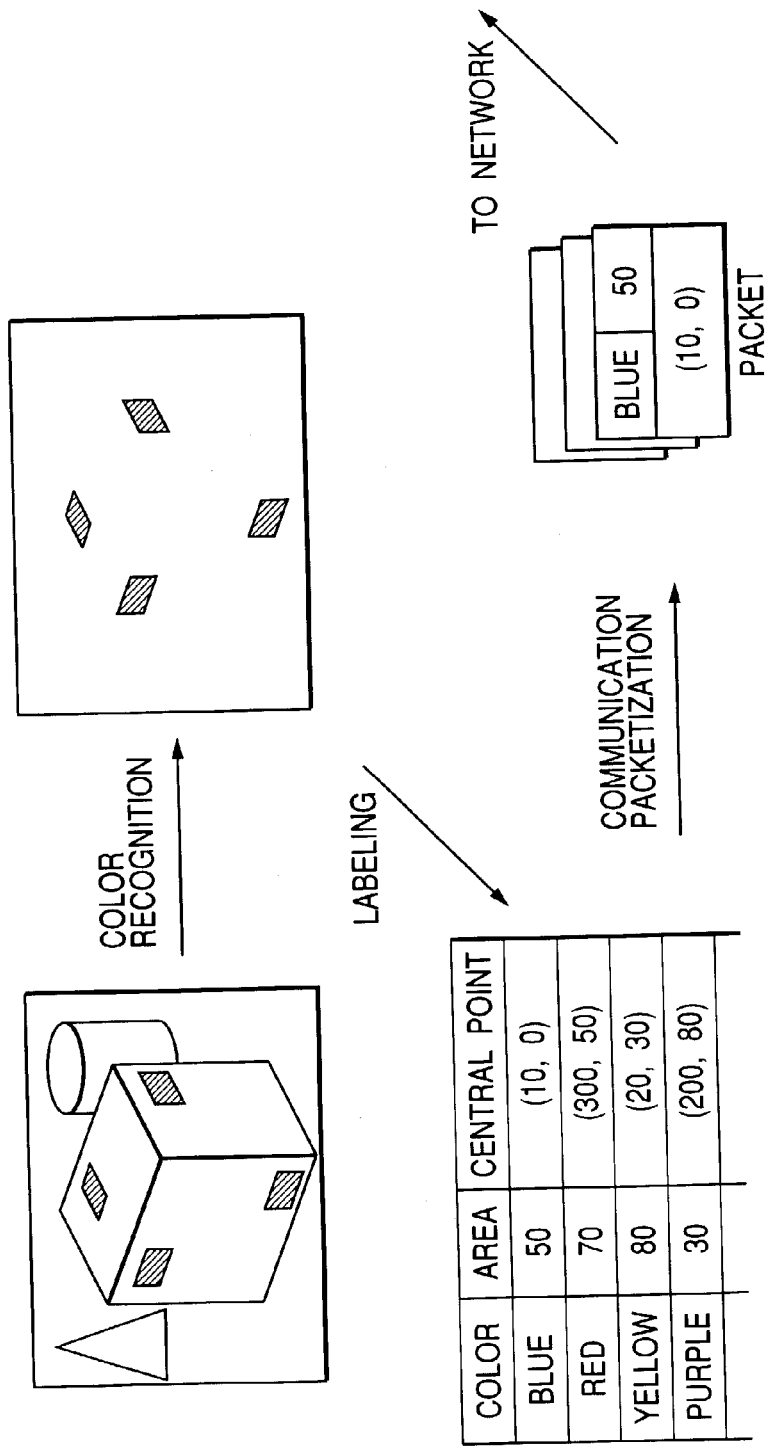
FIG. 10 is a pattern diagram showing an operation of the second embodiment.

The color marker 300 is photographed using the video camera 200 and the image is imported to the computer 100. The computer 100 detects the color markers 300 to 306 from the imported image and calculates barycenters of their areas. The calculation result is output via a network. A pattern diagram of the operation in this embodiment is shown in FIG. 10.

Figure 11:
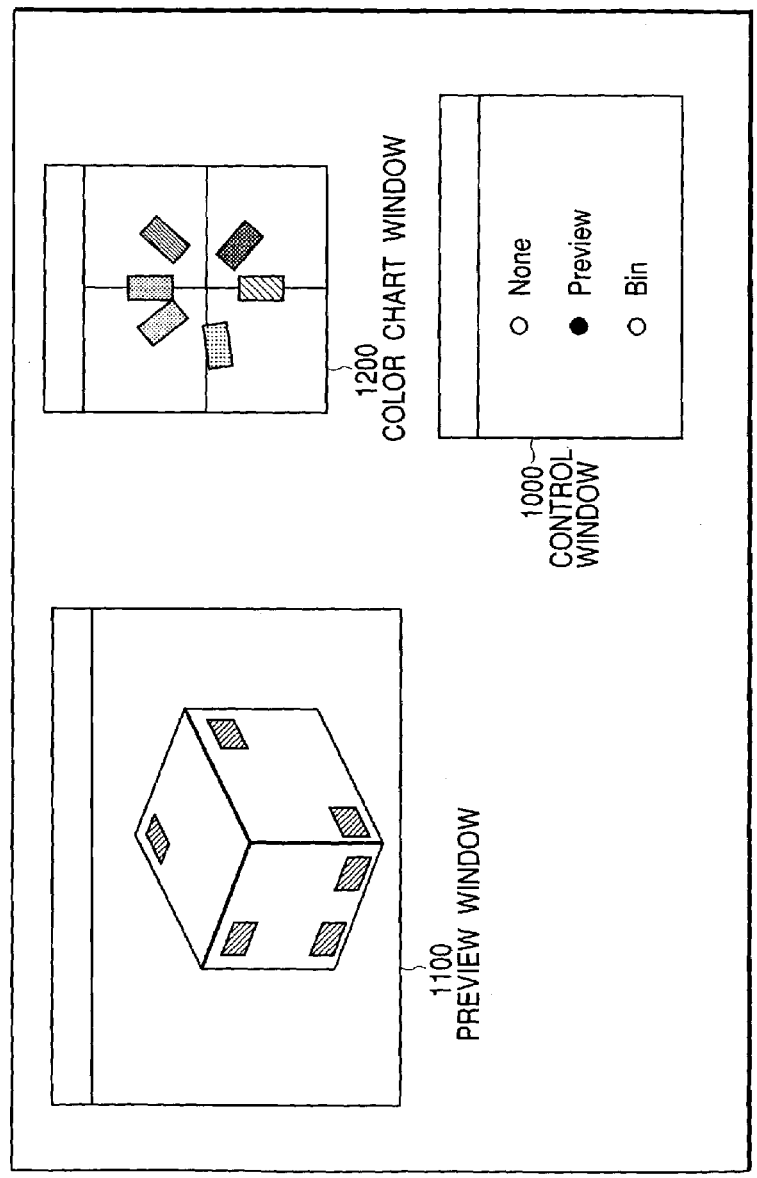
FIG. 11 is a view showing an execution screen of the second embodiment.

Referring to FIG. 11, there is shown an execution screen of this embodiment. The execution screen comprises a control window 1000, a preview window 1100, and a color chart window 1200.

Figure 12:
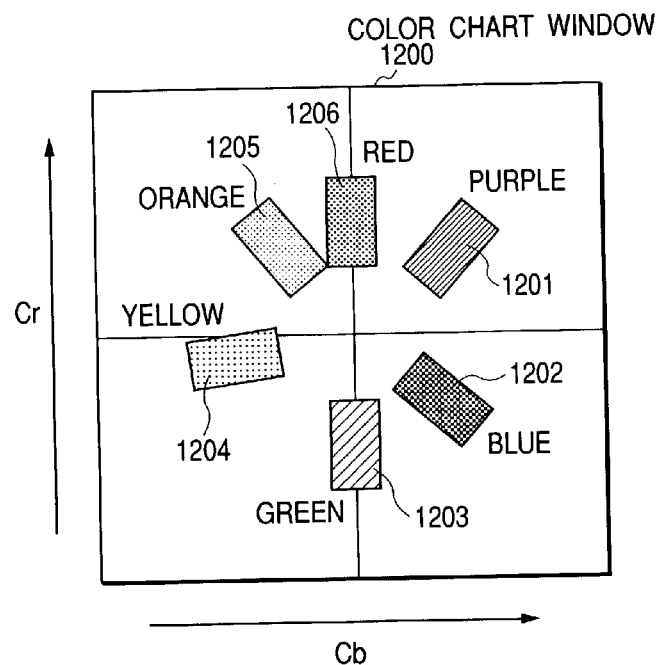
FIG. 12 is a color chart window.

The color chart window 1200 represents a plane with Cr as a horizontal axis and Cr as a vertical axis. Color parameters of colors to be recognized are represented by rectangular color recognition areas 1201, 1202, 1203, 1204, 1205, and 1206 radially extending from a starting point on the Cb-Cr plane (FIG. 12). The color recognition program determines a pixel color by determining whether Cb and Cr values of the pixel color are within the color areas 1201, 1202, 1203, 1204, 1205, or 1206 when the pixel color is converted to the Cb and Cr values.

The color recognition areas 1201, 1202, 1203, 1204, 1205, and 1206 are identified by a central point of the rectangle, a size thereof in the circumferential direction, and a size thereof in the radial direction in the same manner as in the first embodiment.

The color marker is identified by specifying the color recognition area 1201, 1202, 1203, 1204, 1205, or 1206 corresponding to each color of the color marker.

The color recognition areas 1201, 1202, 1203, 1204, 1205, and 1206 can be moved by dragging a mouse on the color chart window and can be changed in size. The operation is changed according to which portion of the color recognition area is dragged.

Figure 13:
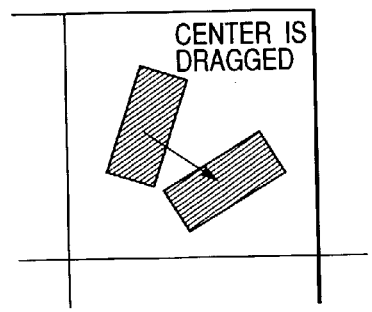
FIG. 13 is a view showing an operation in dragging the center of the color recognition area.

By dragging the mouse at the center of the color recognition area, the color recognition area can be moved (FIG. 13). After a completion of the dragging, the point where a button of the mouse has risen (mouse up) is a new central point of the color recognition area. The color recognition area is moved in rotation around the starting point rather than in parallel. The moved color recognition area is also a rectangle radially extending from the starting point.

Figure 14:
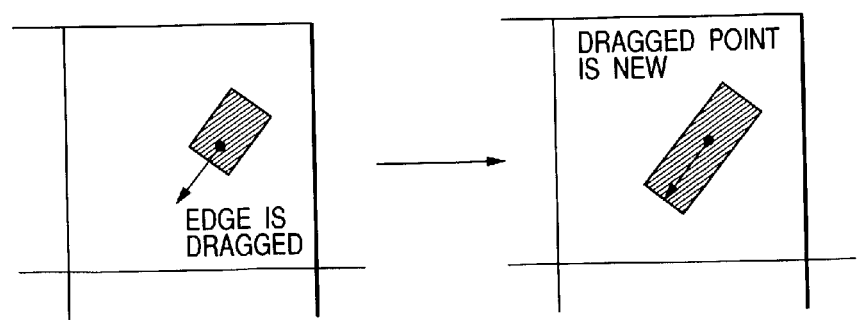
FIG. 14 is a view showing an operation in dragging an edge of the color recognition area.

By dragging the mouse at an edge of the color recognition area, the size of the color recognition area can be changed (FIG. 14). After a completion of the dragging, the point where the button of the mouse has risen is a new edge of the rectangle.

The control window 1000 has preview changeover switches 1001 and 1002 of the preview window 1100. If the preview changeover switch 1001 or 1002 is switched, the content displayed on the preview window 1100 is changed to a direct image of the video camera 200 or to a result of the color recognition.

By graphically operating the color recognition areas 1201, 1202, 1203, 1204, 1205, and 1206 while viewing the color recognition result displayed on the preview window 1100, the recognized colors of the color recognition areas 1201, 1202, 1203, 1204, 1205, and 1206 can be adjusted to match the colors of the color markers.

Figure 15:
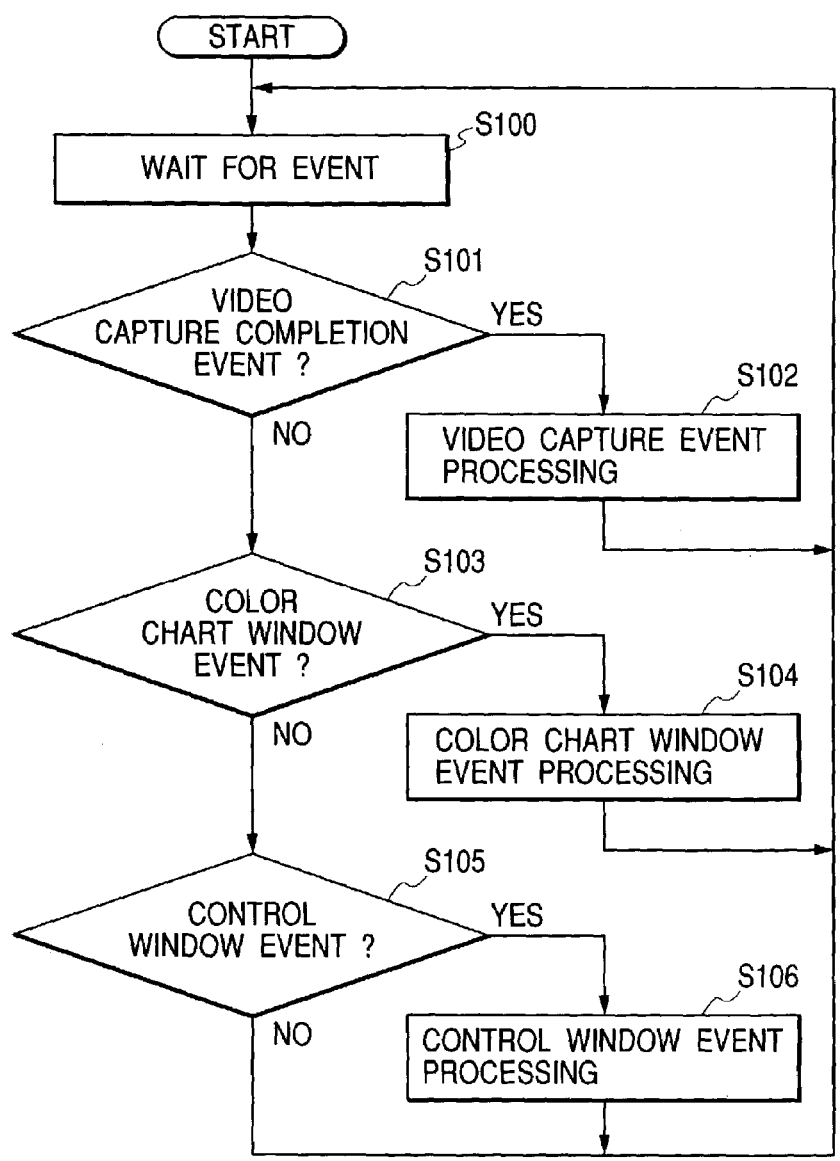
FIG. 15 is a flowchart of a main routine.

Referring to FIG. 15, there is shown a flowchart of the main routine of the program according to this embodiment.

The program runs in the event-driven method. A capture event occurs when it is completed to capture a single screen from the video camera 200. In addition, a mouse event occurs when a mouse is dragged on the color chart window 1200. When a button is selected on the control window, the control window event occurs.

The main routine is generally awaiting an event (S100) and performs a video capture event process (S102), a color chart window event process (S104), and a control window event process (S106) according to an event that has occurred (a video capture completion event in S101, a color chart window event in S103, or a control window event in S105).

Figure 16B:
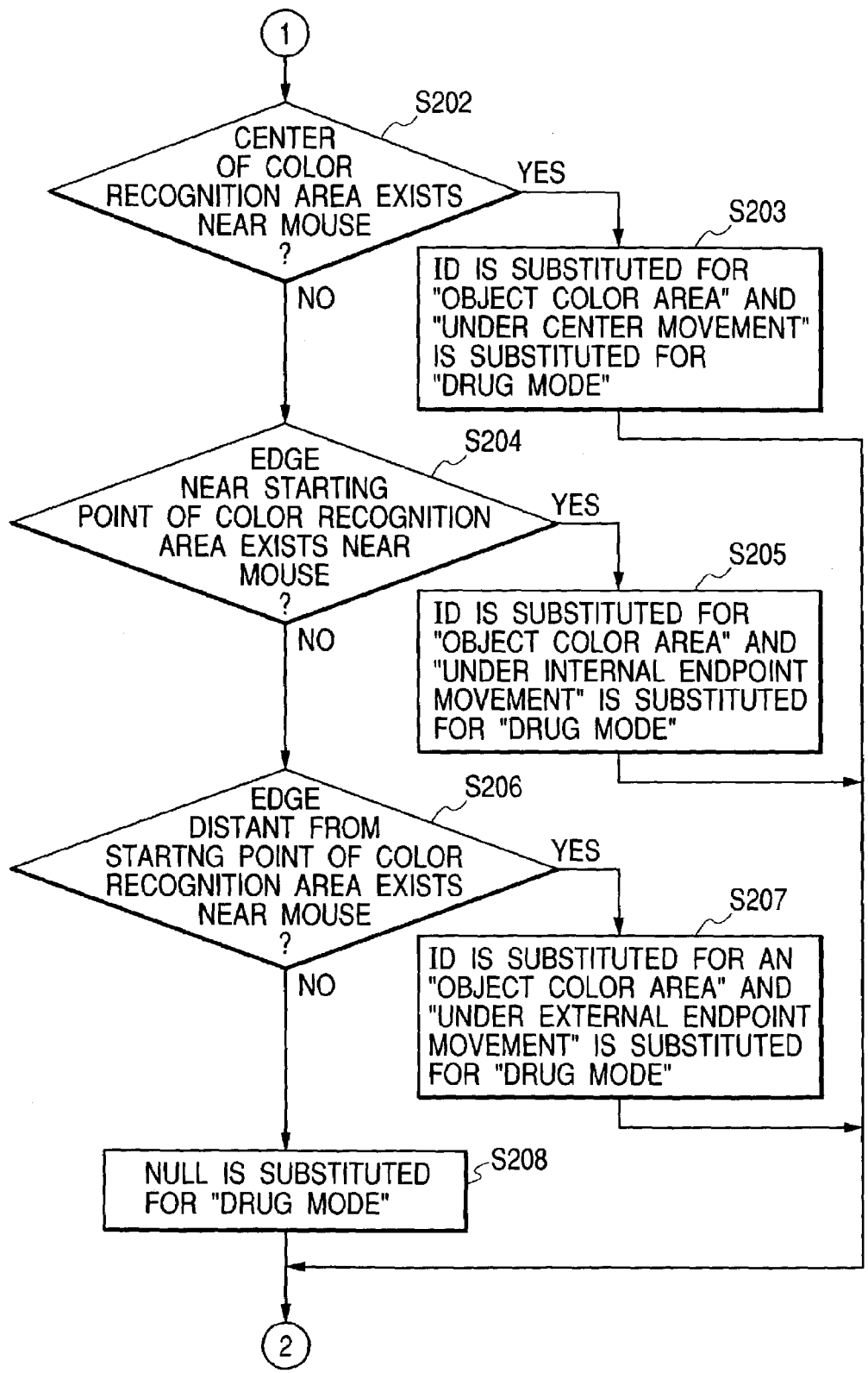
FIG. 16 is comprised of FIGS. 16A and 16B showing flowcharts of a routine for processing an event to the color chart window.

Referring to FIGS. 16A and 16B, there is shown an internal flowchart of the process at an occurrence of the color chart event (S104).

If a mouse down event occurs in step S200, it is checked that a central point of the color recognition area 1201, 1202, 1203, 1204, 1205, or 1206 exists in the vicinity of the mouse coordinates (S202).

If the center of the color recognition area exists in the vicinity of the mouse, "under center movement" is substituted for a variable "drag mode" and an ID of the corresponding color recognition area is substituted for a variable "object color recognition area" (S203).

Unless the center of any of the color recognition areas exists in the vicinity of the mouse, it is checked that an edge nearer the starting point of the color recognition area 1201, 1202, 1203, 1204, 1205, or 1206 exists in the vicinity of the coordinates of the mouse (S204).

If the edge nearer the starting point of the color recognition area exists in the vicinity of the mouse, "under internal endpoint movement" is substituted for the variable "drag mode" and an ID of the corresponding color recognition area is substituted for the variable "object color recognition area" (S205).

Unless the edge nearer the starting point of any of the color recognition areas exists in the vicinity of the mouse, it is checked that an edge distant from the starting point of the color recognition area 1201, 1202, 1203, 1204, 1205, or 1206 exists in the vicinity of the coordinates of the mouse (S206).

If an edge distant from the starting point of the color recognition area exists in the vicinity of the mouse, "under external endpoint movement" is substituted for the variable "drag mode" and an ID of the corresponding color recognition area is substituted for the variable "object color recognition area" (S207). Unless the central point nor the edge of the color recognition area 1201, 1202, 1203, 1204, 1205, or 1206 exists in the vicinity of the coordinates of the mouse, "NULL" is substituted for the variable "drag mode" (S208).

When a mouse up event occurs, the process is changed by the variable "drag mode" (S220, S222, S224).

If the variable "drag mode" is "under center movement," the center coordinates of the color recognition area specified by the variable "object color recognition area" are replaced with the coordinates of the mouse (S221).

If the variable "drag mode" is "under internal endpoint movement," the center coordinates and the size in the radial direction among the color parameters of the color recognition area specified by the variable "object color recognition area" are updated in the following method.

It is assumed that x and y represent the original center coordinates, radiation_len represents the original size in the radial direction, and mouse_x and mouse_y represent the mouse coordinates. Furthermore, assuming that new center coordinates is new_x, new_y and that a new size in the radial direction is new_radiation_len as new color parameters, they are found using the following equation and the color parameters are updated (S223).

angle=atan2 (y, x);

x_offset=radiation_len*cos (angle)/2;

y_offset=radiation_len*cos (angle)/2;

opposite_x=x−x_offset;

opposite_y=y−y_offset;

new_x=(mouse_x+opposite_x)/2;

new_y=(mouse_y+opposite_y)/2;

new_radiation_len=sqrt (pow (mouse_x−opposite_x, 2)+pow (mouse_y−opposite_y, 2));

In other words, the position where the button of the mouse has risen becomes an edge (nearer the starting point) of the rectangle indicating a new color recognition area.

In the same manner, if the variable "drag modes" is "under external endpoint movement," the center coordinates and the size in the radial direction among the color parameters of the color recognition area specified by the variable "object color recognition area" are updated in the following method.

It is assumed that x and y represent the original center coordinates, radiation_len represents the original size in the radial direction, mouse_x and mouse_y represent mouse coordinates. Furthermore, assuming that new center coordinates are new_x, new_y and a new size in the radial direction is new_radiation_len as new color parameters, they are found using the following equations and the color parameters are updated (S225).

angle=atan2 (y, x);

x_offset=radiation_len*cos (angle)/2;

y_offset=radiation_len*sin (angle)/2;

opposite_x=x+x_offset;

opposite_y=y+y_offset;

new_x=(mouse_x+opposite_x)/2;

new_y=(mouse_y+opposite_y)/2;

new_radiation_len=sqrt (pow (mouse_x−opposite_x, 2)+pow (mouse_y−opposite_y, 2));

If the position of the color recognition area is updated, a value of the color recognition table is updated so as to match it (S226) and then the window is re-drawn (S226).

Figure 17:
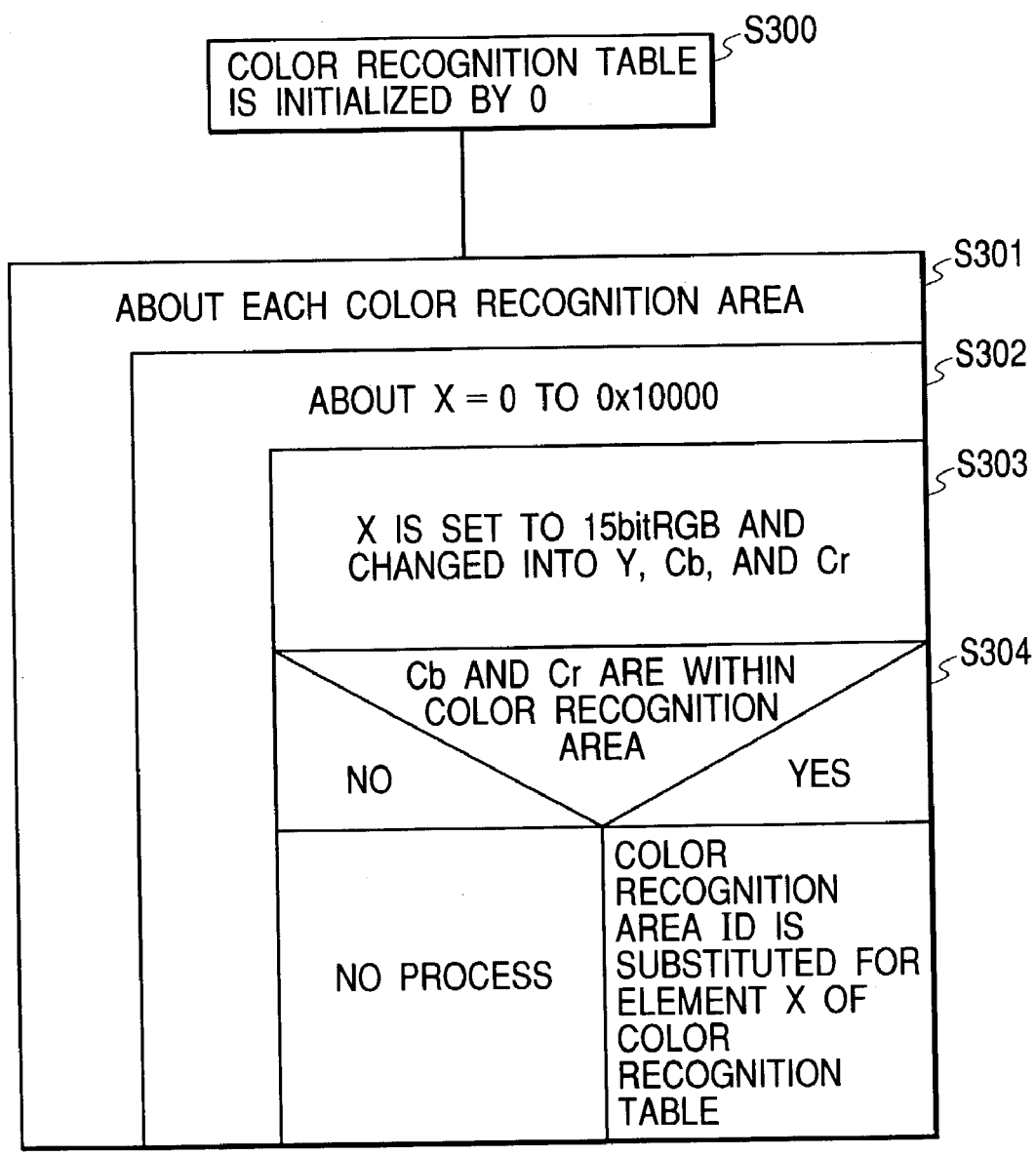
FIG. 17 is a PAD showing a method of generating a color recognition table.

The color recognition table is an array having the size of 32768 (15 bits). The array corresponds to a 15-bit RGB value. It is stored that the 15-bit RGB value corresponds to which color recognition area. FIG. 17 shows a PAD for generating the color recognition table.

First, the color recognition table is initialized to 0 (S300). Then, processes in steps S302 to S305 are performed for each of the color recognition areas (S301). For all the values 0 to 0xffff of the 15-bit RGB value (S302), a certain RGB value x is converted to Cb, Cr each having 8 bits (S303); if the Cb, Cr values exist within the color recognition area, an ID of the color recognition area is substituted for an element having an index x of the color recognition table (S304).

Figure 18:
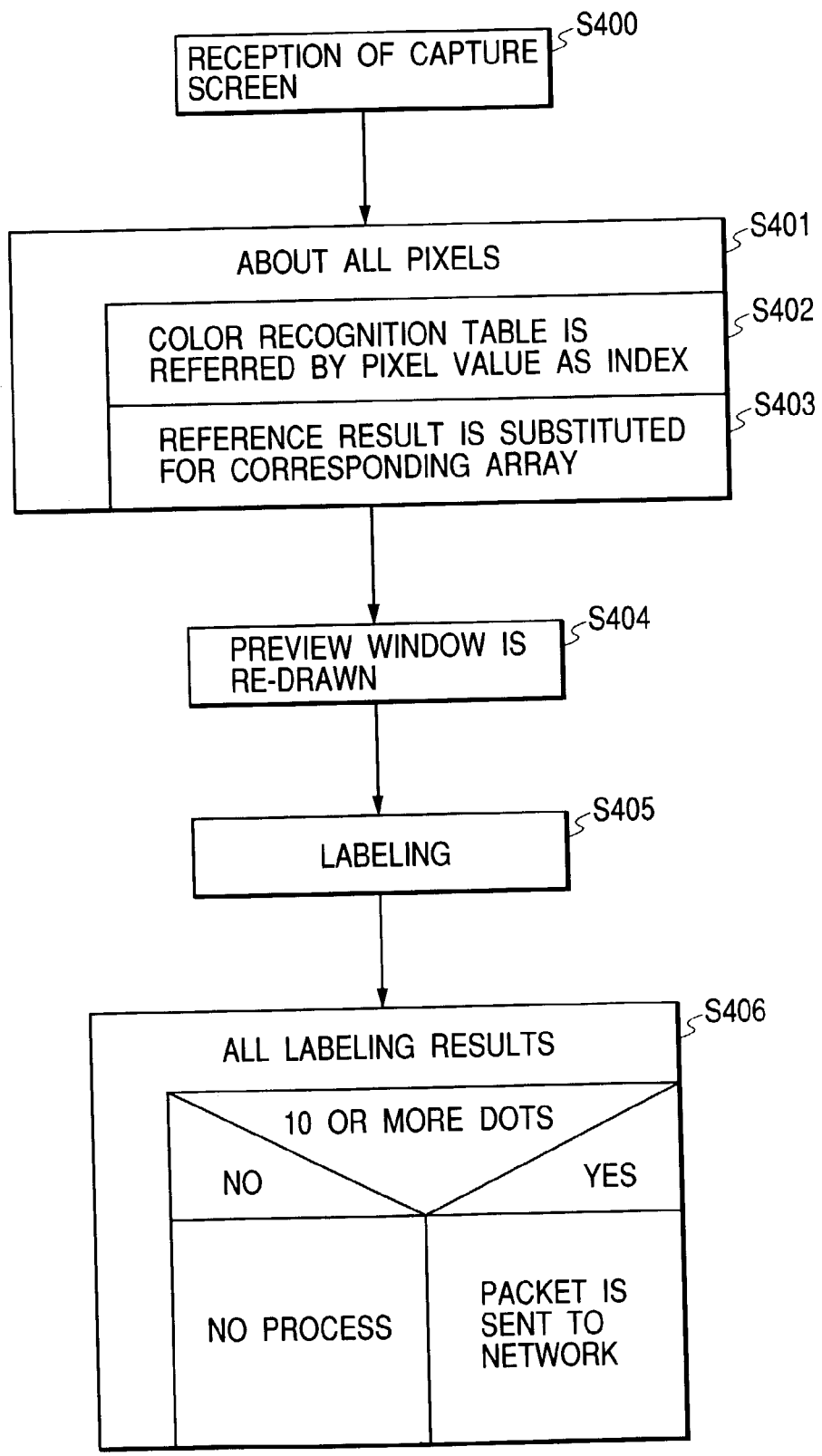
FIG. 18 is a flowchart of a routine for processing a capture event.

Referring to FIG. 18, there is shown an internal PAD for the process at an occurrence of a capture event (S102).

First, a captured image is color-recognized and then hex-valued so as to correspond to the colors of the color recognition areas as shown in FIGS. 16A and 16B (S401 to S403). Each part of the color recognition area is replaced with image data in numerical terms for each color in such a way that a part of the color recognition area ID 1 (a blue portion) is replaced with 1 and a part of the color recognition area ID2 (a red portion) is replaced with 2. Other parts are considered to be 0.

The captured image is received (S400) and processes in steps S402 and S403 are performed for all the pixels of the image (S401). The color recognition table is referenced using a pixel value (15-bit RGB) as an index to acquire the color recognition area ID corresponding to the pixel value (S402). The acquired color recognition area ID is written to an array having the same size as the image (640*240) as a color recognition result (S403).

The preview window is re-drawn on the basis of the array acquired as the color recognition result (S404). The re-drawn image is displayed in a form of the captured image or of the color recognition result in the view mode.

To display the color recognition result, the elements in the array are displayed using black for 0, red for 1, blue for 2, and the like for the corresponding pixels of the preview window.

The image data is labeled (S405) to generate a block data indicating "which color exists in how large area around which coordinates." The description of the labeling algorithm is omitted here since it is generally known.

Regarding the labeling result, a packet is sent to a registered client via a network with a set of "a color ID, an area, (x, y) coordinates of the central point" of an image having a certain area (having 10 dots or more in this embodiment) (S406).

According to this embodiment, the color recognition parameters can be adjusted intuitively and simply.

(Other Embodiments)

It is also possible to enable the color recognition parameters acquired in the first embodiment to be fine-adjusted in the method described in the second embodiment.

Furthermore, while the luminance/color-difference signal is used in the above embodiments, other signals can be used only if it is a signal composed of a signal indicating luminosity such as L*a*b* and a signal indicating a hue.

In addition, the present invention encompasses a case in which a software program code for realizing the functions of the above embodiments is supplied to a computer in a device or a system connected to various devices so as to operate to realize the functions of the above embodiments and the various devices are operated according to the program stored in the computer (CPU or MPU) in the system or the device.

In this case, the software program code realizes the functions of the above embodiments and therefore the present invention comprises the program code or means for supplying the program code to the computer such as, for example, a storage medium storing the program code.

The storage medium for storing the program code can be a floppy disk, a hard disk an optical disk, a magneto-optical disk, a CD-ROM, a magnetic tape, a nonvolatile memory card, or a ROM, for example.

Naturally, the present invention encompasses not only a program code in the computer executed to realize the functions of the above embodiments, but also a program code executed in combination with an operating system (OS) operating in the computer or with other application software or the like to realize the functions of the above embodiments. Furthermore, apparently the present invention encompasses a case in which the supplied program code is stored in a feature expansion board of the computer or in a memory in a feature expansion unit connected to the computer and thereafter a CPU or the like in the feature expansion board or the feature expansion unit performs a part or all of the actual processes on the basis of instructions of the program code to realize the functions of the above embodiments in the processes.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An information processing method for setting a color recognition parameter for recognizing a specific color from an image, comprising the steps of:
    acquiring a photographed image of a color sample in which markers are arranged in a predetermined pattern; and
    calculating the color recognition parameters for detecting the markers by analyzing the photographed image, said calculating step further including the steps of
        detecting a marker area from the photographed image, and
        calculating the color recognition parameters based on a color distribution graph where color information of pixels in the marker areas is plotted on a two-dimensional plane, and
    wherein a predetermined guide pattern is added to the color sample.

2. A method according to claim 1, wherein the guide pattern is a lattice shape.

3. A method according to claim 1, wherein the guide pattern is arranged as a lattice shape enclosing the markers.

4. A method according to claim 1, wherein the minimum polygon including points plotted on the color distribution graph is calculated and wherein the color recognition parameters are calculated from the polygon.

5. An information processing method for setting a color recognition parameter for recognizing a specific color from an image, comprising the steps of:
    acquiring a photographed image of a color sample including a specific color marker;
    binarizing a signal indicating luminosity of a photographed image and detecting a marker area;
    plotting a color signal of the marker area;
    performing a labeling process for a result obtained by said plotting step; and
    setting a color recognition parameter for identifying a color area of the specific color marker from a result obtained by the labeling process.

6. A method according to claim 5, wherein a result obtained by the detection of the marker area and the plotting result are displayed.

7. An information processing method according to claim 5,
    wherein the color recognition parameter is a parameter indicating a polygon extending in a radial direction from a starting point on the color distribution graph.

8. A method according to claim 7, wherein the polygon is a rectangle.

9. A method according to claim 8, wherein the polygon extending in the radial direction from the starting point on the color plane is displayed graphically and wherein the color recognition parameter can be adjusted by adjusting the polygon on a display screen.

10. A method according to claim 9, wherein a method of adjusting the polygon is changed according to a starting position specified by a user in the polygon adjustment.

11. A method according to claim 7, wherein a plurality of color recognition parameters can be set to recognize a plurality of specific colors and wherein polygons respectively corresponding to the plurality of color recognition parameters are displayed on the color plane.

12. A computer-readable storage medium which stores therein a program for setting a color recognition parameter for recognizing a specific color from an image, comprising the processes of:
    acquiring a photographed image of a color sample in which markers are arranged in a predetermined pattern; and
    calculating the color recognition parameters for detecting the markers by analyzing the photographed image, the calculating process further including the processes of
        detecting a marker area from the photographed image, and
        calculating the color recognition parameters based on a color distribution graph where color information of pixels in the marker areas is plotted on a two-dimensional plane, and
    wherein a predetermined guide pattern is added to the color sample.

13. A computer-readable storage medium which stores therein a program for setting a color recognition parameter for recognizing a specific color from an image, comprising the steps of:
    acquiring a photographed image of a color sample including a specific color marker;
    binarizing a signal indicating luminosity of a photographed image and detecting a marker area;
    plotting a color signal of the marker area;
    performing a labeling process for a result obtained by said plotting step; and
    setting a color recognition parameter for identifying a color area of the specific color marker from a result obtained by the labeling process.

14. An information processing apparatus for setting a color recognition parameter for recognizing a specific color from an image, comprising:
    an image acquisition unit, adapted to acquire a photographed image of a color sample in which markers are arranged in a predetermined pattern; and
    a calculator unit, adapted to calculate the color recognition parameters for detecting the markers by analyzing the photographed image, said calculator unit being further adapted to detect a marker area from the photographed image, and to calculate the color recognition parameters based on a color distribution graph where color information of pixels in the marker areas is plotted on a two-dimensional plane, and
    wherein a predetermined guide pattern is added to the color sample.

15. An information processing apparatus for setting a color recognition parameter for recognizing a specific color from an image, comprising:
   an image acquisition unit, adapted to acquire a photographed image of a color sample including a specific color marker;
   a binarization unit, adapted to binarize a signal indicating luminosity of a photographed image and detecting a marker area;
   a plotter, adapted to plot a color signal of the marker area;
   a labeling unit, adapted to perform a labeling process for a result obtained by said plotter; and
   a parameter setting unit, adapted to set a color recognition parameter for identifying a color area of the specific color marker from a result obtained by said labeling unit.

* * * * *